United States Patent [19]

Crawford et al.

[11] Patent Number: 5,649,221

[45] Date of Patent: Jul. 15, 1997

[54] REVERSE ELECTRONIC DICTIONARY USING SYNONYMS TO EXPAND SEARCH CAPABILITIES

[76] Inventors: H. Vance Crawford, Traver Hollow Rd., P.O. Box 36, Boiceville, N.Y. 12412; Joel Crawford, Utrechtsestraat 77-3, 1017 VJ Amsterdam, Netherlands

[21] Appl. No.: 528,359

[22] Filed: Sep. 14, 1995

[51] Int. Cl.$^6$ .............................. G06F 3/14; G06F 17/21
[52] U.S. Cl. .................... 395/794; 395/760; 395/601
[58] Field of Search ...................... 364/419.11, 419.08, 364/419.19

[56] References Cited

U.S. PATENT DOCUMENTS

| | | |
|---|---|---|
| 3,995,254 | 11/1976 | Rasenbaum . |
| 4,384,329 | 5/1983 | Rosenbaum et al. . |
| 4,503,514 | 3/1985 | Urquhart . |
| 4,799,188 | 1/1989 | Yashimura . |
| 4,833,610 | 5/1989 | Zamara et al. . |
| 5,229,936 | 7/1993 | Decker et al. . |
| 5,297,038 | 3/1994 | Saits . |
| 5,297,039 | 3/1994 | Kanagami et al. . |
| 5,321,609 | 6/1994 | Yianilas et al. . |
| 5,383,121 | 1/1995 | Latkeman . |

OTHER PUBLICATIONS

McCormick, John; Instead of Scrapping Your Word Processor Just Add New Utilities Government Computer News, V12, N2, p. 25; Jan. 18, 1993.

Roget's II The New Thesaurus, The American Heritage Dictionary, 1988.
Websters New Word Dictionary, 3rd Edition, 1988.
Loomis, Mary, "Data Management and File Structures", 2nd Ed. 1989.

*Primary Examiner*—Gail O. Hayes
*Assistant Examiner*—George N. Stevens
*Attorney, Agent, or Firm*—Sandra M. Kotin

[57] ABSTRACT

A method for the retrieval from an electronic dictionary of a word which is known or believed to exist but can not be brought to mind or a word that is thought may exist, to replace a pedestrian word or phrase. A complete thesaurus and dictionary are needed to establish numeric codes. The numeric codes designate synonym groups and are assigned to thesaurus entries and are thereafter transferred to corresponding dictionary entries and their definition words. The synonym groups can be expanded to include related words and words that are not technically synonyms. Words having no synonyms are assigned unique numeric codes or can be included within the synonym groups of one or more related words. The user enters one or more search words which are thought may exist in the definition of the word sought. After locating the numeric code(s) for the search word(s) the dictionary is searched for words having those numeric code(s) within their definitions. As each of such words is found it is displayed as a candidate for the word sought. At any time after a candidate is displayed the user can view the full dictionary listing for that word. The numeric codes are internal to the computer and are not visible to the user.

7 Claims, 7 Drawing Sheets

REVERSE ELECTRONIC DICTIONARY USING SYNONYMS TO EXPAND SEARCH CAPABILITIES

FIELD OF THE INVENTION

The instant invention relates to a method of word retrieval for electronic dictionaries and other reference works which utilizes a numeric search routine in conjunction with a complex system of assigned numeric codes establishing synonym groups within a large synonym database enabling the word sought to be accessed while allowing for variety in the defining word sets entered.

BACKGROUND OF THE INVENTION

There have been a variety of electronic dictionaries published, such as the American Heritage Talking Dictionary, the Meriam Webster's Collegiate Dictionary and the Random House Unabridged Dictionary, which operate on full text searches with Boolean operators. These rely on a specific definition or a specific combination of words to access the word sought. Any deviation in the defining words entered from that of the specific database definition will not access the word sought and therefore contributes to the limited performance of such dictionaries.

A number of patents have issued for various "dictionaries", but careful scrutiny reveals that most of these patents are for methods or processes for checking the spelling of words in a document (U.S. Pat. Nos. 3,995,245; 4,503,514; 4,799,188; 4,833,610; and 5,297,038).

U.S. Pat. No. 5,229,936 to Decker, et al. describes a method for storage and retrieval of all forms of a word. This method is for use in electronic dictionaries, bilingual dictionaries and thesauri. The words are broken down by stem and ending sets, parts of speech and grammatical information. This system can be utilized for translating words from one language to another and to obtain grammatical information pertaining to the second language. Letkeman, in U.S. Pat. No. 5,383,121 describes a computer generated dictionary wherein words and defining phrases are reduced to numerical storage units that are compressed into a minimum of storage space. The defining phrases can be stored in several different languages so that the user can retrieve the sought after defining phrase in the desired language.

Rosenbaum, et al. (U.S. Pat. No. 4,384,329) teaches a method for finding a series of synonyms for a given word. This method defines an automatic thesaurus. The words are arranged in an N×N matrix wherein an "on" bit (1) corresponds to a synonym. Column positions of the "on" bit are stored. The search is performed on the first four letters of a word. A similar system can be used to retrieve antonyms, but a separate storage system and matrix are required for the antonyms.

There is a need for an electronic dictionary that can retrieve a word when one or more words which appear in its definition, or one or more words related to or synonyms for words appearing in its definition are entered. There is a need for a dictionary that anticipates the defining words that the user might enter in order to find the word sought and that therefore relies on a large database of synonyms in order to broaden search capabilities without sacrificing the speed of the search and retrieval.

BRIEF SUMMARY OF THE INVENTION

The present invention provides an electronic dictionary or word retrieval system that enables access to a desired word by entering one word or a two word combination that defines the word sought. Numeric codes stored in a large database assist in the retrieval process and provide one or more candidate words. The full dictionary entry for any of the candidate words can be displayed at the user's discretion. The numeric codes enable the use of synonym groups which provide variety in the set of defining words that can be entered and thereby make the retrieval of the word sought more certain. Table I illustrates the use of different word combinations.

TABLE I

| Column A | Column B | Column C |
|---|---|---|
| acephalous | lacking | without |
|  | head | leader |
| acrophobia | dread | fear |
|  | height | altitude |
| alveolus | small | little |
|  | cavity | hole |
| bulimia | constant | continual |
|  | craving | desire |
| collegium | group | gathering |
|  | equal | same |
| pedant | show | flaunt |
|  | knowledge | erudition |
| poltergeist | noisy | clangorous |
|  | ghost | spook |
| sally | saying | adage |
|  | witty | facetious |
| shrive | free | release |
|  | guilt | blame |
| votive | offered | tendered |
|  | vow | promise |

Column A: main entry words
Column B: words which yield main entry word using Merriam Webster's Electronic Dictionary
Column C: words which will not yield main entry word using Merriam Webster's Electronic Dictionary
Note: both words in Column B and in Column C will yield the main entry word of Column A with the present invention It is an object of the present invention to provide an electronic word retrieval system or dictionary that is not specific to a single set of defining words.

It is another object of the present invention to provide an electronic dictionary based largely on a wide database of synonyms that are compartmented into various synonym groups.

Another object of the present invention is to have numeric codes assigned to all main entry words and all words found in their respective definitions.

It is a further object of the present invention to use only synonym groups that are appropriate to the word sought.

A still further object of the present invention is to enhance the speed of retrieval by avoiding manipulation of irrelevant synonym groups.

A further object of the present invention is to assign the numeric codes using all available number combinations starting with the lowest numbers.

A still further object of the present invention is to assign the lowest numbers to the most frequently used words to speed search capabilities.

Another object of the present invention is to enable the user to view all candidate words and obtain the full dictionary entry for any candidate word at his or her discretion.

A still further object of the present invention is to have the numeric codes stored in memory for computer access, but not visible to the user.

Other features and advantages of the invention will be seen from the following description, tables and flow diagrams.

DETAILED DESCRIPTION OF THE INVENTION

The reverse dictionary of the present invention depends on a dictionary database numerically encoded for quick and easy access. Every main entry word as well as each word in each definition is assigned a numeric code, either a synonym group numeric code or, if the word has no synonym, a unique identifier. One, or more often two defining words are entered for the search. The numeric codes for the defining words are found and stored. Thereafter, the search proceeds by locating main entry words having the numeric codes for both of the entered defining words within their definitions. As each such main entry word is found it is displayed as a candidate for the word sought. The user can call up the full dictionary entry for any candidate word as soon as it appears on the screen.

A storage system large enough to hold entire thesaurus and dictionary files with 20 to 30 megabytes in excess memory is required to effect the process which is performed in two phases. Phase I establishes the complex system of numeric codes required for the computer assisted search, and Phase II sets forth the actual search sequences. Once the final numeric codes have been assigned, Phase I is completed and the thesaurus can be removed from memory. The published material (CD ROM, diskettes, etc.) need only hold the complete dictionary with the numeric codes and the search command sequence.

The process works best with a thesaurus and dictionary that complement each other. The nomenclature used herein is that found in Webster's Collegiate Thesaurus and Webster's Collegiate Dictionary and these references were used for all of the examples cited. However, the process can be accomplished with any dictionary and thesaurus combination.

PHASE I (establishing and assigning the numeric codes):

The entire thesaurus is loaded into the computer storage system for examination and processing. Multiple entries of the same word frequently occur in a thesaurus to differentiate the meanings associated with various parts of speech, for example, when the same word is used as a noun and an adjective, a noun and a verb, an adverb and a proposition, etc. It is unrealistic for users to make these distinctions and requiring them to do so will only add complexity to the system. Therefore, multiple entries are collapsed into one single entry.

Figure 1:
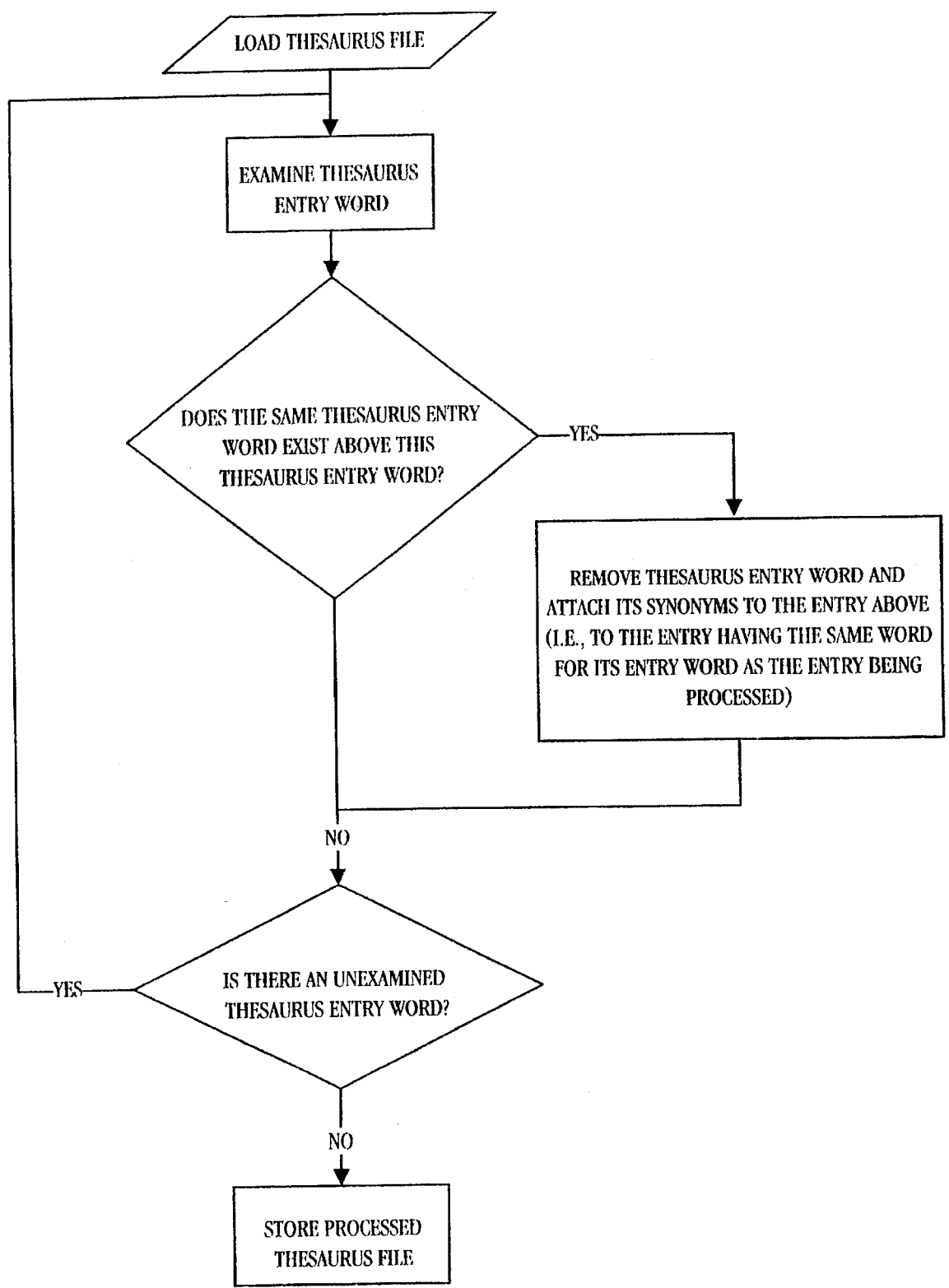
FIG. 1 is a flow chart illustrating the process for collapsing multiple entries under a single entry word.

The first step in processing the thesaurus is to examine the thesaurus entries for each multiple occurrence of the same word. (Table IIA) Referring to FIG. 1, all entries of the same word are removed except for the first such entry. All of the synonyms that were associated with each of the successive entries are appended to the synonym group of the first entry. (Table IIB) When this step has been completed, there will be only one entry for each thesaurus main entry word. The main entries are identified as those words having listings which include an illustrative sentence. In Webster's Collegiate Thesaurus these sentences are enclosed in angle brackets (<>).

TABLE II A

Sample thesaurus entries aback adv
syn UNAWARES short, sudden etc.
abaft, adv < >
syn aft, astern
abaft prep < >
syn back of, behind
abalienate vb
syn TRANSFER alien, alienate, etc
abandon vb < >
syn chuck, desert, forsake, etc.
syn RELINQUISH, cede, give up, etc.
abandon n < >
syn UNCONSTRAINT, ease, naturalness, etc.
syn impulsiveness, uninhibitedness,
unrestraint, etc.
abandoned adj < >
syn DERELICT deserted, desolate
syn dissolute, licentious, etc.

TABLE II B

Collapsing of multiple entries aback adv
syn UNAWARES short, sudden etc.
abaft adv < >
syn aft, astern
syn back of, behind
abalienate vb
syn TRANSFER alien, alienate, etc
abandon vb < >
syn chuck, desert, forsake, etc.
syn RELINQUISH, cede, give up, etc.
syn UNCONSTRAINT, ease, naturalness, etc.
syn impulsiveness, uninhibitedness,
unrestraint, etc.
abandoned adj < >
syn DERELICT deserted, desolate
syn dissolute, licentious, etc.

Note:
Only the exact forms of a word are combined, thus abandoned remains as a separate listing.

Figure 2:
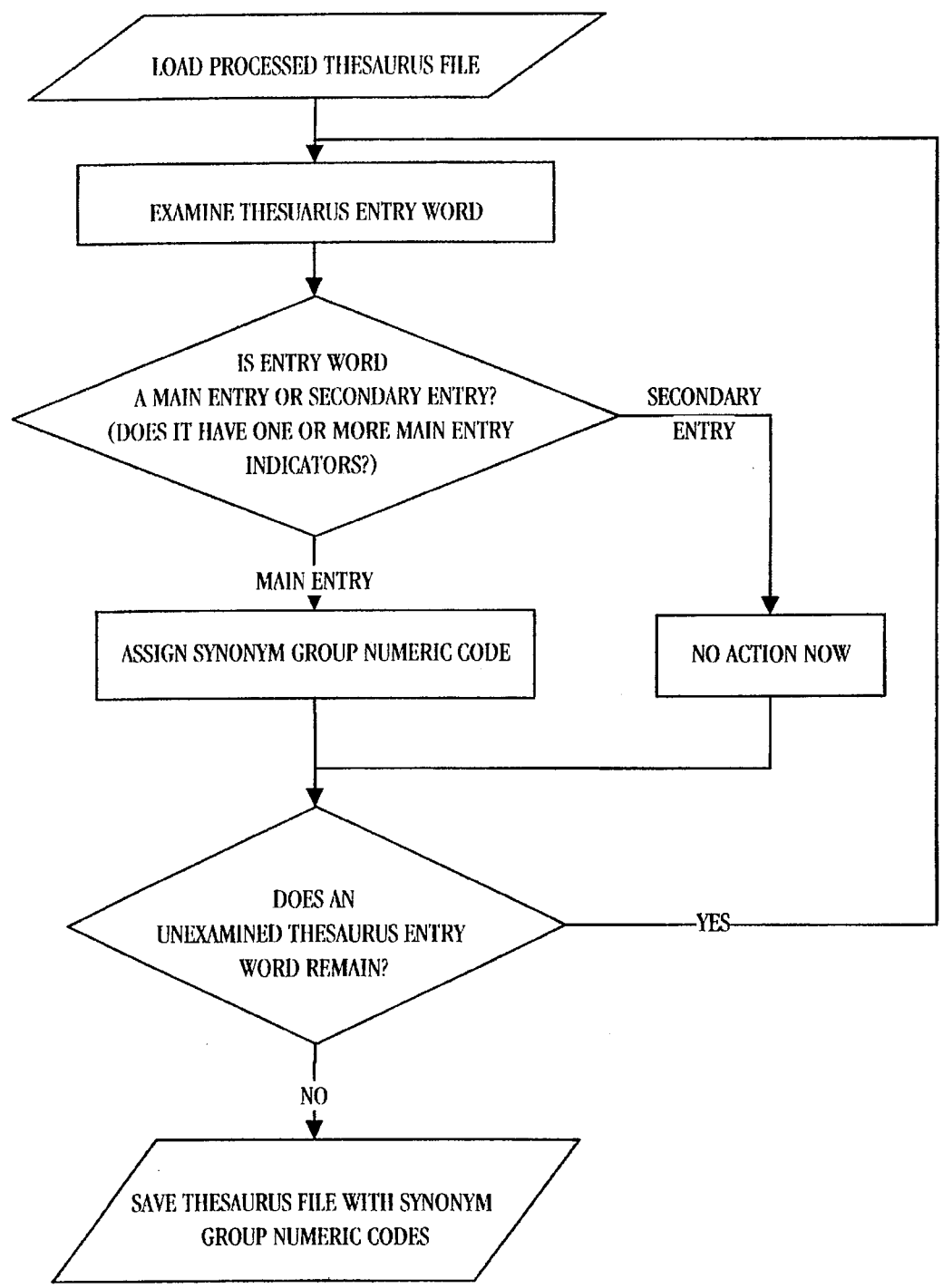
FIG. 2 is a flow chart illustrating the initial thesaurus processing wherein the numeric codes are assigned to the main entries.

With reference to FIG. 2 a synonym group numeric code is assigned to each main entry. The numeric codes are assigned beginning with the first main entry and continuing in alpha sequence as seen in Table IIIA. The synonym group numeric codes consist of five (5) digits, wherein the first three digits represent the page in the thesaurus on which the word is found and the last two digits represent the numerical order of the main entry on that page. That same synonym group numeric code will eventually be assigned to each of the synonyms of the main entry word. These include any synonyms appended to that word due to multiple entries as noted above. The program is not designed to distinguish the parts of speech. However, each part of speech will have different synonyms and those will be associated with a main entry word.

TABLE III A

Assignment of Synonym Group Numeric Codes to
Thesaurus Main Entry Words

| | |
|---|---|
| SKIP | aback adv |
| | syn UNAWARES short, sudden etc. |
| 00102 | abaft adv < > |
| | syn 00102 aft, 00102 astern |
| | syn 00102 back of, 00102 behind |
| SKIP | abalienate vb |
| | syn TRANSFER alien, alienate, etc. |
| 00105 | abandon vb < > |
| | syn 00105 chuck, 00105 desert, 00105 forsake, etc. |
| | syn RELINQUISH, cede, give up, etc. |
| | syn UNCONSTRAINT, ease, naturalness, etc. |
| | syn 00105 impulsiveness, 00105 uninhibitedness, 00105 unrestraint, etc. |
| 00107 | abandoned adj < > |
| | syn DERELICT deserted, desolate |
| | syn 00107 dissolute, 00107 licentious, etc. |

Note:
Main entries are recognized by usage of the word in a sentence designated herein by the symbol < >
Synonym group numeric codes are only assigned to main entries. Those numbers, as illustrated above., are later assigned to their synonyms.
Secondary entries are indicated by a word printed in all capital letters and are assigned synonym group numeric codes later.

Figure 3:
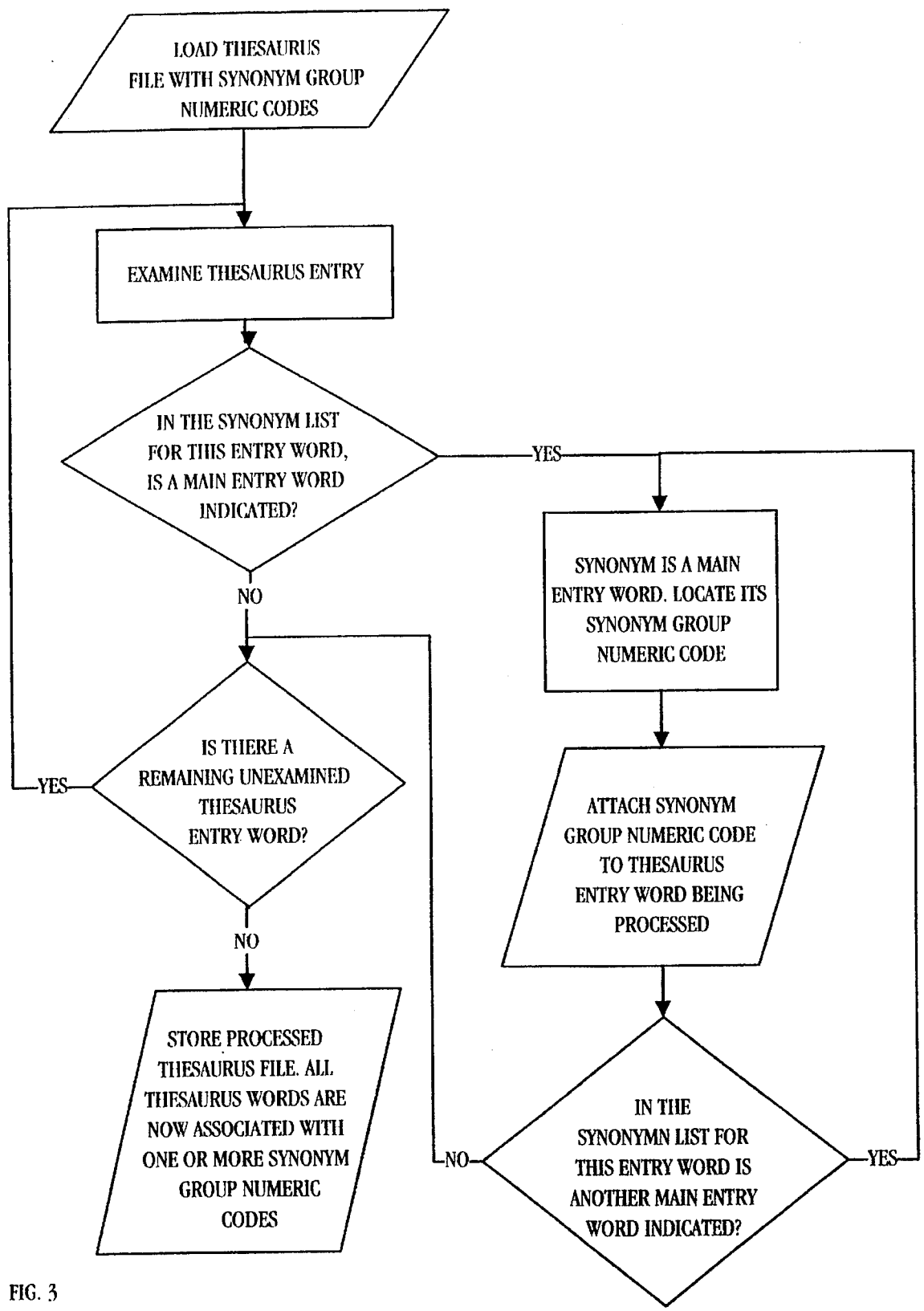
FIG. 3 is a flow chart illustrating the final thesaurus processing wherein the numeric codes are assigned to the secondary entries.

When all of the main entries have been assigned synonym group numeric codes, the secondary entries are examined. Each secondary entry is assigned its appropriate synonym group numeric code. Refer to FIG. 3. In the Webster's Collegiate Thesaurus the secondary entries can be recognized by the inclusion of one or more words printed in all capital letters. Each secondary entry is listed elsewhere as a main entry. The numeric code is obtained from the listing of the word in capitals as a main entry. This way the appropriate numeric code is assigned to the word and duplication or use of extra numbers is avoided. If more than one secondary entry is located, each must be assigned its proper numeric code. When this step has been completed, all main entries, all secondary entries and all of their respective synonyms will have one or more synonym group numeric codes as illustrated in Table III B.

TABLE III B

Assignment of Synonym Group Numeric Codes to
Thesaurus Secondary Entry Words

| | |
|---|---|
| 79223 | aback adv |
| | syn 79223 UNAWARES, 79223 short, 79223 sudden etc. |
| 00102 | abaft adv < > |
| | syn 00102 aft, 00102 astern |
| | syn 00102 back of, 00102 behind |
| 77702 | abalienate vb |
| | syn 77702 TRANSFER, 77702 alien, 77702 alienate, etc. |
| 00105 | abandon vb < > |
| | syn 00105 chuck, 00105 desert, 00105 forsake, etc. |
| | syn 61218 RELINQUISH, 61218 cede, 61218 give up, etc. |
| | syn 79626 UNCONSTRAINT, 79626 ease, 79626 naturalness, etc. |
| | syn 00105 impulsiveness, 00105 uninhibitedness, 00105 unrestraint, etc. |

TABLE III B-continued

Assignment of Synonym Group Numeric Codes to
Thesaurus Secondary Entry Words

| | |
|---|---|
| 00107 | abandoned adj < > |
| | syn 20111 DERELICT, 20111 deserted, 20111 desolate etc. |
| | syn 00107 dissolute, 00107 licentious, 00107 profligate, etc. |

Note:
After assigning synonym group numeric codes to the secondary entries the word "abandon" has 3 synonym group numeric codes, 00105, 61218, 79626, and the word "abandoned" has 2 synonym group numeric codes 00107 and 20111.

Figure 4:
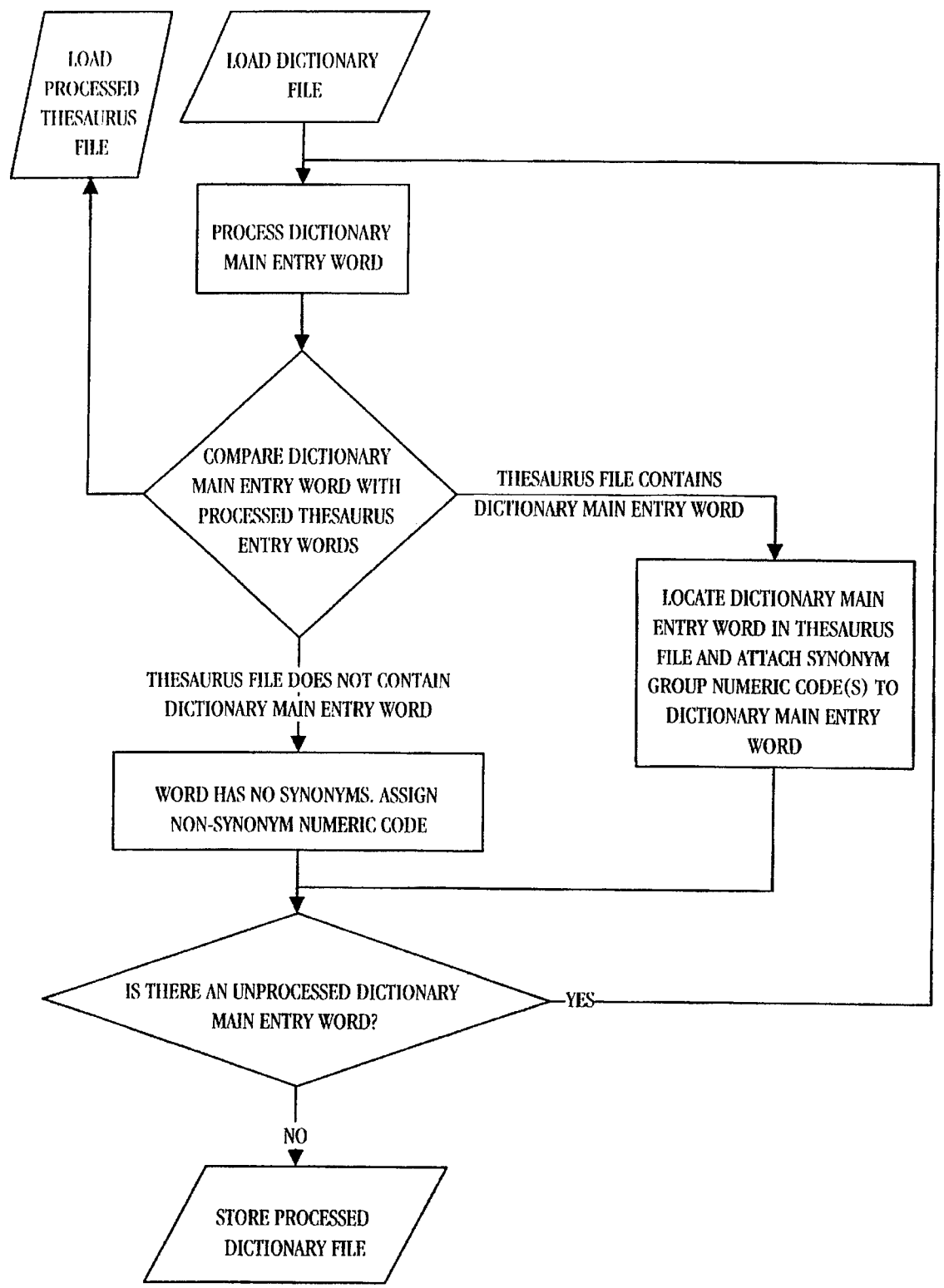
FIG. 4 is a flow chart illustrating the initial dictionary processing.

The next step is to load the entire dictionary into the computer storage system containing the thesaurus. Referring to FIG. 4, each dictionary main entry is examined for a match with a main or secondary entry from the thesaurus. When a match is found, the five digit synonym group numeric code (or codes) is affixed to the dictionary main entry word.

If no match is found, indicating that the main entry has no synonym, a unique six digit numeric code is affixed to the dictionary word. The six digit number is comprised of four digits for the dictionary page on which it is found and two digits for the position of the word on that page.

After all dictionary main entries have been examined, each will have been assigned one or more synonym group numeric codes which are not unique, or a unique six digit numeric code which indicates that the word has no synonym or does not belong to a synonym group.

The thesaurus was needed to establish the synonym group numeric codes and once this has been accomplished it is no longer needed. All of the data from the thesaurus can now be removed from memory leaving the entire dictionary with the appropriate numeric codes affixed to each main entry. From this point on, a synonym data base per se is no longer needed.

Having established numeric codes for all dictionary main entry words, their definitions are examined and each word in each definition is assigned the numeric code associated with its listing as a dictionary main entry word. There will be instances where different definition words will have the same numeric code(s). This happens when two or more words in a definition are synonyms. There may also be words in a definition that are repeated so that the assigned numeric code(s) will be repeated. Redundant numeric codes are eliminated. See FIG. 5 and the example in Table IV.

TABLE IV

Illustration of the sequence in the assignment of synonym
group numeric codes to a main entry definition in the dictionary

| | |
|---|---|
| 086120 | PHILOLOGY |
| | the study of literature and of disciplines relevant to literature or to language as used in literature |
| 086120 | PHILOLOGY |
| | the 120816 study 62405, 05409, 28404, 15419, 65219 of 079645 literature 067208 and 004309 of 079645 disciplines 58930, 85609, 58928, 75429 relevant 61209 to 76906, 02017, 07328, 82016 literature 067208 or 080642 to 76906, 02017, 07328, 82016 language 43922, 75822 as 07216 used 82514 in 73011, 58829 literature 067208 |
| 086120 | PHILOLOGY |
| | the 120816 study 62405, 05409, 28404, 15419, 65219 of 079645 literature 067208 and 004309 of — |

TABLE IV-continued

Illustration of the sequence in the assignment of synonym
group numeric codes to a main entry definition in the dictionary disciplines 58930, 85609, 58928, 75429
relevant 61209 to 76906, 02017, 07328, 82016
literature — or 080642 to —
language 43922, 75822 as 07216 used 82514
in 73011, 58829 literature —

Note:
after a word is assigned its numeric codes, the numbers are not repeated the successive times the same word is used 086120     PHILOLOGY
120816, 62405, 05409, 28404, 15419, 65219, 079645,
067208, 004309, 58930, 85609, 58928, 75429, 61209,
76906, 02017, 07328, 82016, 080642, 43922, 75822,
07216, 82514, 73011, 58829

Note:
all of the numeric codes are listed

086120     PHILOLOGY
02017, 05409, 07216, 07328, 15419, 28404, 43922,
58829, 58928, 58930, 61209, 62405, 65219, 73011,
75429, 75822, 76906, 82016, 82514, 85609
004309, 067208, 079645, 080642, 120816

Note:
the nummic codes are regrouped in ascending order, first the five digit numeric codes, then the six digit numeric codes 086120     PHILOLOGY
05409, 15419, 28404, 43922, 58928, 58930, 61209
62405, 65219, 75429, 75822, 82514, 85609,
067208

Note:
the numeric codes for "the" "of" "and" "to" "or" "as" and "in" have been removed. This example does not illustrate the renumbering as suggested for the actual dictionary to utilize the lowest numbers.
The final dictionary record for philology as stored would look like the last sequence shown above, followed by the full dictionary listing including pronunciation, part of speech, word derivation, definition, etc.
Note:
The numeric codes above do not reflect the renumbering sequence.

Figure 5:
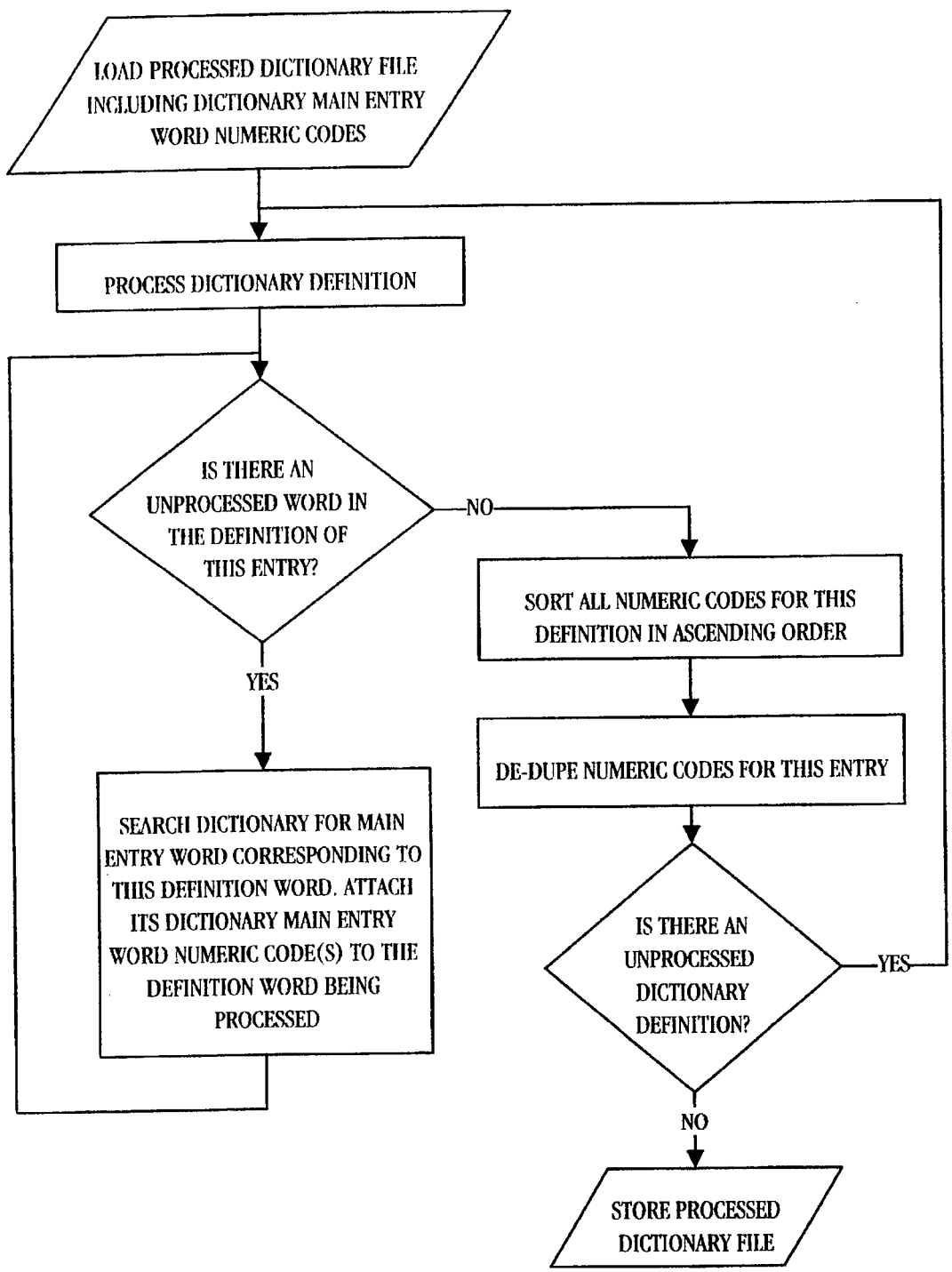
FIG. 5 is a flow chart illustrating the final dictionary processing.

The numeric codes assigned in a given definition are sorted and arranged in ascending order and positioned immediately following the dictionary main entry word but before the usual dictionary information which includes the pronunciation, word origin, etc. The user can only see the usual dictionary information, but the computer has access to the numeric codes for each main entry and the sequence of numeric codes obtained from the definition, arranged in ascending order. This sequence of steps is illustrated in FIG. 5 and an example is provided in Table IV.

One of the significant improvements offered by the present invention is its ability to limit the numeric codes to 65,536, the 16th power of 2 (the natural limitation of two bytes of eight bits each). To remain within this limiting number, it is necessary to count the occurrences of numeric codes assigned to definition words, renumbering them so that those occurring most frequently are assigned the lowest numbers (five digit numbers). All possible numbers should be utilized. See FIG. 6. By assigning the lowest numbers to the words most frequently used, they are accessed first and greatly facilitate the definition searches. There are many entry words that are not used in any definitions and therefore need no number assigned to them. These consist of obscure words and scientific terms as seen in Table V. (Other examples: ganister, ganja, gannet, gantelope, gantlet ... )

Gerunds and other verb forms that are not useful as key words in definition searches will not have assigned numbers. Numeric codes for very short common words such as articles or prepositions which are not useful as key words in definition searches can be eliminated. This procedure is also illustrated in Table IV. These eliminations, in addition to helping stay within the 65,536 limit, will increase search speed.

Figure 6:
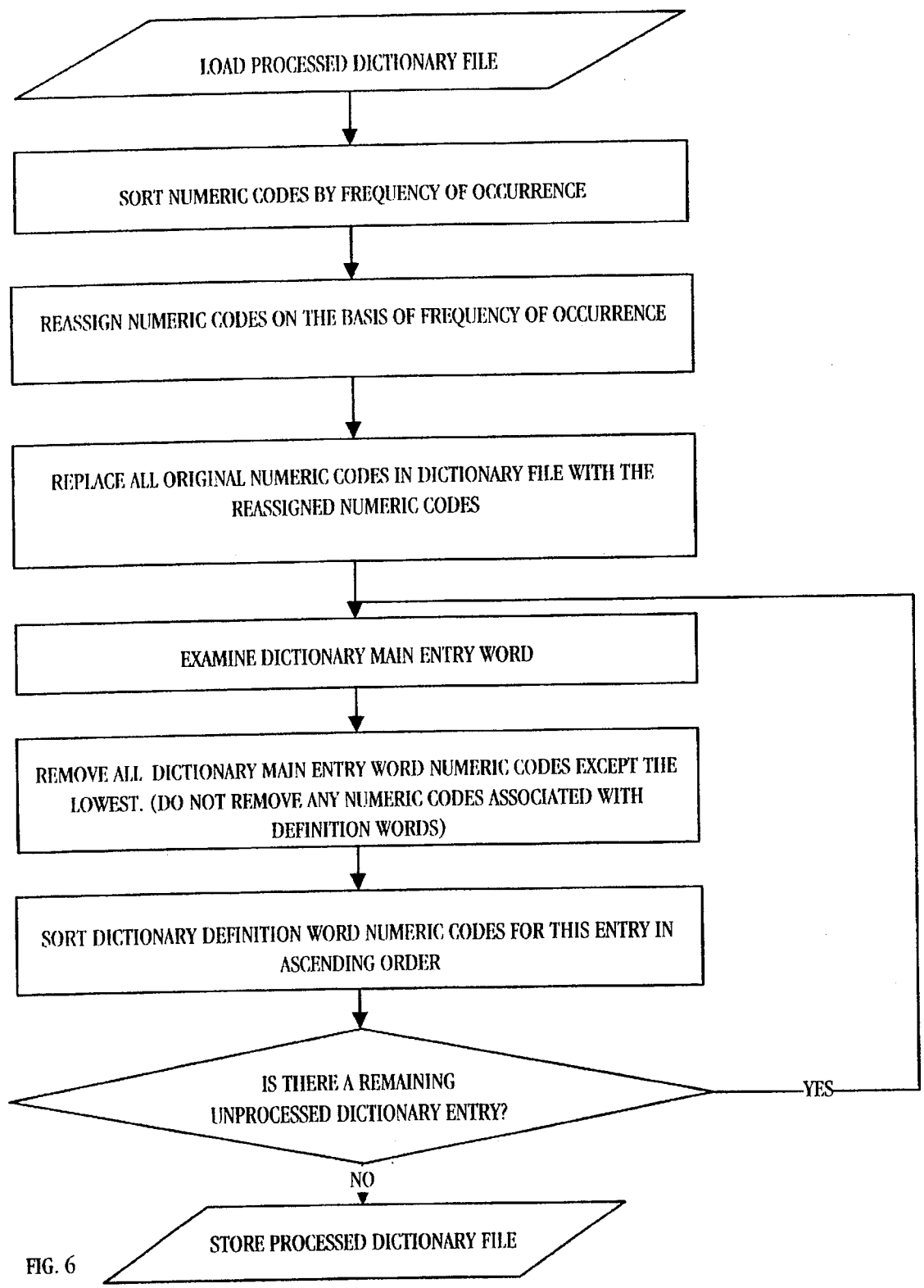
FIG. 6 is a flow chart illustrating the reprocessing of the numeric codes.

As previously noted, many main entries will have more than one numeric code. These were necessary when the main entry numeric codes were assigned to the dictionary definition words. Now, all except the lowest number assigned to each main entry dictionary word can be eliminated as seen in FIG. 6 and illustrated in Table V. Only the lowest number for the main entry listing is needed, but it must conform to the renumbering scheme described above. The numeric codes associated with the definitions are not affected.

TABLE V

Illustration of the removal of unnecessary numeric codes
(Each of the words listed below would be followed by the sequence of numeric codes for the definition words and the definitions, parts of speech and other dictionary information)

| BEFORE REMOVAL OF UNNECESSARY NUMERIC CODES: | |
|---|---|
| 000135 | abaca |
| 79223 | aback |
| 000137 | abacterial |
| 000138 | abacus |
| 00102 | abaft |
| 77702 | abalienate |
| 00105, 61218, 79626 | abandon |
| 00107, 20111 | abandoned |
| AFTER REMOVAL OF UNNECESSARY NUMERIC CODES: | |
| 000135 | abaca |
| • | aback |
| • | abacterial |
| 000138 | abacus |
| 00102 | abaft |
| • | abalienate |
| 00105 | abandon |
| 00107 | abandoned |

Notes:
•aback, abacterial and abalienate are used in no definitions so their numeric codes are eliminated
"abandon" loses the numeric codes 61218 and 79626
When a user enters "relinquish" or "unconstraint" or any of their synonyms, 61218 or 79626 will be retrieved. These numeric codes will have been placed with any definition which includes those words or their synonyms, including "abandon". "Abandoned" loses the numeric code 20111 for the same reason.

Once the numeric codes are in place within the dictionary the database is complete and the word retrieval system can be utilized. All of the usual dictionary information such as parts of speech, pronunciation, definition, roots and derivations, etc., remains in the database and can be accessed when needed. None of the numeric codes can be seen by the user. They are used only by the computer for the search sequence.

Figure 7:
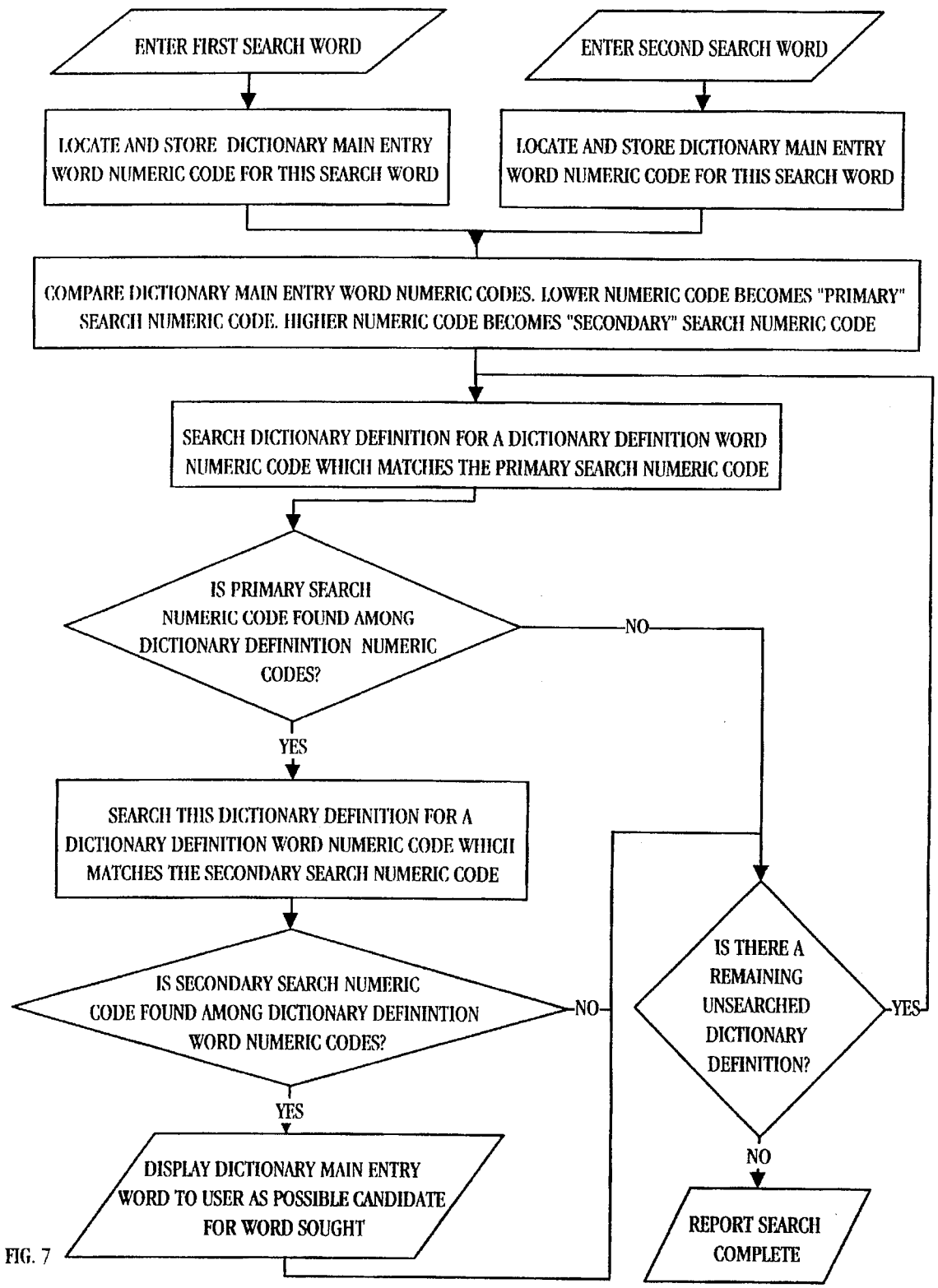
FIG. 7 is a flow chart illustrating the search sequence of the present invention.

PHASE II (conducting the search):

Referring to FIG. 7, a computer program is written to conform to the following steps for retrieving a word for which the approximate definition is known or imagined (the reverse dictionary):

1. One or more key definition words are chosen. Two key words work well.
2. The first definition word is typed and entered
3. The search of the main entry words is immediately begun for a match for the word entered
4. When the word is found, the numeric code for that word is stored
5. The tab key is struck and the second definition word is typed and entered
6. The search of the main entry words is immediately begun for a match for the second word entered
7. When the word is found, the numeric code for this word is stored (Both of these searches are instantaneous. The numeric codes are the critical data and it is on these stored numbers that the retrieval depends.)

8. The two numeric codes are compared. The smaller number designates the "primary word" while the other becomes the "secondary word" for search purposes.

9. The definition word numeric codes following each dictionary main entry word are searched in sequence for a match with the primary word numeric code.

(Since the numeric codes following the dictionary main entry words were arranged in ascending order, the search continues only until a match or a number larger than itself is found. See Table VI. The smaller the primary word numeric code, the shorter the search time required for a match.)

TABLE VI

Example of computer search sequence

Definition words entered: study language
Computer finds the words and stores their numeric codes:
                study        05409      language 43922
Primary word:     study        05409      (smaller number)
Secondary word:  language  43922      (larger number)
Computer now searches for the primary word numeric code among the numbers listed after each main entry in the dictionary. As soon as the numeric code is located, the computer searches that same definitionfor the secondary word numeric code. When found, the main entry is listed on the screen as a "candidate". All definitions are searched for the primary word numeric code. Each time the primary word numeric code is found, a search is made for the secondary word numeric code in the same definition.
The search ends when all main entries containing both numeric codes are located and displayed as candidates, (or no definition containing both words is found):
    086120    PHILOLOGY
                    05409, 15419, 28404, 43922, 58928, 58930, 61209
                    62405, 65219, 75429, 75822, 82514, 85609
                    067208
Computer now lists PHILOLOGY as a candidate word. User can now click on PHILOLOGY and the entire dictionary listing will appear and the user can decide if PHILOLOGY was the word sought.
Alternate definition words: literature language
Computer finds the words and stores their numeric codes:
                literature   067208      language 43922
Primary word:     language     43922      (5 digit number)
Secondary word:  literature    067208      (6 digit number)
Search sequence is begun as stated above. Both numeric codes are found in the definition of PHILOLOGY.
    086120    PHILOLOGY
                    05409, 15419, 28404, 43922, 58928, 58930, 61209
                    62405, 65219, 75429, 75822, 82514, 85609
                    067208
Computer now lists PHILOLOGY as a candidate word. User can now click on PHILOLOGY and the entire dictionary listing will appear and the user can decide if PHILOLOGY was the word sought.
Other word combinations could have been entered as the definition words and the word sought PHILOLOGY would have been retrieved.

Note:
If other worxts were also retrieved as "candidates", the user need only click on them to review their definitions and decide which word was the one sought.

10. When a match is found, a search of the definition word numeric codes for the same entry word is made for match with the secondary word numeric code. If a match is found, the dictionary main entry word is displayed as a candidate for the word sought.

11. The search sequence, steps 9 and 10, is repeated until the entire dictionary has been searched and all candidate words have been displayed.

12. As candidates appear, the user can designate any displayed word and obtain its complete dictionary entry, pronunciation, part of speech, derivation, definition, etc., to determine if that candidate is the word being sought.

As can be seen from the above sequence and in Table VI, each search progresses in stages. Once the first or primary word numeric code is located, only that definition need be searched for the secondary word numeric code. This limits the search for the secondary word numeric code and conserves search time.

If no candidate words are displayed, the user will be instructed to select a different defining word or words in order to retrieve the word sought.

PHASE I mended (Broadening the number of words in synonym groups):

Related words, contrasted words and antonyms have not been included in synonym groups since most of them will be found as other main entries or secondary entries. Often words that are not true synonyms may be used as defining words for the word retrieval system of the present invention. The large numbers of synonyms within many synonym groups will usually yield the desired word. However, some definitions are phrased in the negative and contrasted words or antonyms must be used to retrieve their respective main entries. These words can be added to the system to optimize performance and to add subtleties to the search capabilities. The extent of these additions will depend upon the discretion of the publisher, the funds available for the project, the amount of memory available and the projected level of sophistication of the user.

If any or all of the above additional word forms are to be included, this inclusion must be accomplished at the time the numeric codes are assigned to the thesaurus main entries and secondary entries, that is, during Phase I.

The thesaurus main entries are examined for the bold face abbreviations "rel" (related words), "con" (contrasted words), and "ant" (antonyms). Each word following the abbreviations is sought in the thesaurus as a main entry or secondary entry. The synonym group numeric code assigned to the main entry being processed is appended to the main entries and secondary entries found, and conversely, the synonym group numeric codes of the main entries and secondary entries are appended to the word being processed. Thus the possible synonym groups available for each of these words is expanded and, in turn, expands the range of the possible definition words that will enable the retrieval of a word sought by the user of the system. A simplified example of this process is found in Table VII.

TABLE VII

Examples of the addition of related words to a pool of synonyms

Thesaurus entry:

order vb 1 to bring about an orderly disposition of individuals, units or elements <ordered his affairs in preparation for marriage>
syn arrange, array, dispose, marshall, methodize, organize, systematize
rel adjust, fix regulate, right; align, fine, line up, range; classify, codify, hierarchize; regiment, routine, routinize; streamline
idiom put (or set) in order; put in shape, put (or set) to rights, reduce to order, whip into shape (or order)
ant disorderliness
rel adjust, fly, regulate, right, etc.
rel adjust 01422 fix 31326 regulate 61105 right 62712, etc.
The synonym group number(or numbers) for the word order, 52412, is added to the synonym group number(s) for each of the words adjust, fix, regulate and right and the synonym group numbers for the related words (adjust 01422, fix 31326, regulate 61105, and right 62712) are added to the synonym group number(s) for the word order Note:
The same method is used for antonyms, contrasted words and faux synonyms Faux synonyms can also be added to the system and will provide another dimension for the user. These are words which are closely related to a main entry but would not be brought up as synonyms in the usual course of a search. For example, "Africa", "Tanzania" and "Serengeti", etc. can be placed in one new synonym group, and "North America", "Mexico" and "Texas", etc. in another. A further example is to add words such as "mammal", "marsupial" and "quadruped" to the synonym group for "animal". The addition of such faux synonyms to the database must be carefully thought out and specifically devised. They can be most helpful when the dictionary is targeted for a specific user group. These additions to the database must also be made before the thesaurus is removed from memory, during Phase I.

As previously noted, words for which no synonyms were found were assigned unique six digit numeric codes. By careful examination, many of these words can become associated with synonym groups. The computer used to set up the database can be programmed to assist in the formation of the new synonym groups, the faux synonym groups, and the assignment of unique words to synonym groups. Manual intervention is required for these steps.

The following sequence of steps is used to expand synonym groups:

1. The words for which six digit numeric codes have been assigned are brought up by accessing the six digit numbers sequentially.
2. The complete dictionary definition of each word, a main entry, is accessed.
3. The computer then searches the definition for words written in all capital letters. If one is found, it is sought in the thesaurus.
4. If the word is found in the thesaurus, the five digit numeric code for that word is used to replace the six digit numeric code originally assigned to the main entry.
5. If that word is not found in the thesaurus, a new synonym group is created with new synonym group numeric codes assigned beginning with 90001.

(The new synonym groups will consist of the dictionary main entries and all words found within their definitions in all capital letters.)

6. Any six digit numeric codes originally assigned to either the main entry or its capitalized definition words are eliminated and replaced with the new series of five digit numeric codes.

These new synonym groups will enable access to words that otherwise would not have been accessible unless the exact word was entered as a search definition word. Faux synonyms can also be treated in this manner and new synonym groups created as noted above. The new 9000 series numeric codes can be used when appropriate.

Once Phase I (with any amended additions) has been completed, and the assignment of any new synonym groups has been accomplished, only the dictionary database with the numeric codes and the search sequence commands need be stored in a central computer's memory or sold on diskettes, CD ROMs, or other suitable storage devices.

The numerical sequencing system of the present invention is not limited to dictionaries. With appropriate modification it can be used to find quotations in Bartlett's, to get a desired topic in an encyclopedia, or to find a specific quotation in a body of material such as the complete works of Shakespeare or the Bible.

While one embodiment of the present invention has been illustrated and described in detail, it is to be understood that this invention is not limited thereto and may be otherwise practiced within the scope of the following claims.

We claim:

1. An improved computer implemented reverse electronic dictionary of the type wherein one or more search words are entered to retrieve a word sought, the improvements comprising:

a wide database of synonyms compartmented into synonym groups which are associated with each main entry and definition word, said synonym groups being formed through the cooperation of a thesaurus with a dictionary, and each of said synonym groups being assigned a numeric code to assist in the retrieval process such that when the search words are entered their numeric codes are located and thereafter the dictionary definitions are searched for definitions containing those numeric codes, the words having definitions containing those numeric codes being displayed as candidate words, said synonym groups thereby enabling a wider variation of the search words entered to retrieve the word sought, and said numeric codes being assigned to said synonym groups by frequency of occurrence to shorten search time.

2. A method for retrieving a word from a computer implemented reverse electronic dictionary containing a wide database of synonyms compartmented into synonym groups wherein all main entry words and definition words have assigned numeric codes designating the synonym groups, said method comprising:

inputting the dictionary;

inputting N defining words;

searching the dictionary for word N;

locating and storing the numeric code for word N;

searching the dictionary for word N-1;

locating and storing the numeric code for word N-1;

repeating the search and storage until all N words have been searched;

comparing the numeric codes whereby the one with lower numerical value becomes the primary search code and the one with the next higher numerical value becomes the secondary search code;

searching the dictionary definitions for a match with the primary search code;

searching a dictionary definition containing the primary search code for a match with the secondary search code;

displaying as a candidate word a word containing both the primary search code and the secondary search code in its definition;

repeating the search throughout the entire dictionary for words containing both search codes in their definitions;

displaying all candidate words; and reporting that the search is complete, whereby the wide database of synonyms provides greater variety in the set of defining words that can be inputted thus increasing the probability of accessing the word sought.

3. A method for establishing a computer implemented reverse electronic dictionary containing a wide database of synonyms compartmented into synonym groups wherein all main entries and definition words have assigned numeric codes designating the synonym groups or non-synonym status, said method comprising:

inputting an entire thesaurus containing main entry words, secondary entry words and their respective synonyms;

identifying each main entry word;

identifying duplications of the main entry word being processed;

removing the duplications;

appending synonyms associated with the duplications to those of the main entry word being processed;

assigning a numeric code, in numerical order, to each main entry word;

identifying each secondary entry word;

assigning the appropriate numeric code to each secondary entry word, said numeric code obtained from the secondary entry word in its location as a main entry word;

storing the thesaurus with all assigned numeric codes;

inputting an entire dictionary containing main entry words and definitions;

identifying each dictionary main entry word;

searching the thesaurus for each dictionary main entry word;

locating the dictionary main entry word in the thesaurus;

assigning the numeric codes from the word in the thesaurus to the same word in the dictionary;

assigning a unique numeric code to each dictionary main entry word not found in the thesaurus;

removing the entire thesaurus;

identifying each word used in the definition of each dictionary main entry word;

searching the dictionary main entry words for each definition word;

locating each definition word as a dictionary main entry word;

assigning the corresponding dictionary main entry word numeric codes to each definition word;

sorting all numeric codes for each definition into ascending order;

removing all duplicate numeric codes in each definition;

positioning the sorted numeric codes from the definition words immediately following each dictionary main entry word; and storing the processed dictionary file, whereby the wide database of synonyms expands search capabilities by increasing the number of definition words associated with a synonym group.

4. A method for establishing an electronic dictionary as in claim 3 further comprising the following steps performed before the thesaurus is removed:

accessing all unique numeric codes sequentially;

locating the complete dictionary definition for each dictionary main entry word associated with a unique numeric code;

searching the definition for a word written in all capital letters;

locating a word written in all capital letters in the definition of the word being processed;

searching the thesaurus for the word written in all capital letters;

locating the dictionary word written in all capital letters in the thesaurus;

replacing the unique numeric code with the numeric code assigned to the thesaurus word;

replacing the unique numeric code of each word not located in the thesaurus with a new numeric code, said new numeric code forming a new synonym group; and storing the processed dictionary file.

5. A method for establishing an electronic dictionary as in claim 3 further comprising the steps of:

sorting all numeric codes assigned to dictionary main entry words by frequency of occurrence;

reassigning numeric codes on the basis of frequency of occurrence;

replacing all original numeric codes in dictionary entries with the reassigned numeric codes;

removing all except the lowest numeric code from each dictionary main entry word, leaving all numeric codes associated with definition words in place;

sorting all numeric codes for each definition into ascending order; and storing the reprocessed dictionary file.

6. A method for establishing an electronic dictionary as in claim 3 whereby the synonym groups are expanded by the following additional steps performed before the dictionary is inputted, said steps comprising:

searching the thesaurus main entries for the bold face abbreviations rel, con and ant;

searching the thesaurus main entries and secondary entries for each word following each abbreviation;

locating the main entries and secondary entries;

appending the numeric code of the main entry being processed to the thesaurus main entries and secondary entries found;

appending the numeric codes of the thesaurus main entries and secondary entries found to the main entry being processed; and storing the thesaurus with all assigned numeric codes.

7. A method for establishing an electronic dictionary as in claim 3 whereby the range of synonym groups is expanded and new synonym groups are created from lists of related words, further comprising the following additional steps:

forming a list of related words;

selecting a dictionary main entry with which the list of related words is to be associated;

appending the numeric code of the dictionary main entry to each of the words on the list; and storing the processed dictionary file.

* * * * *